UNITED STATES PATENT OFFICE.

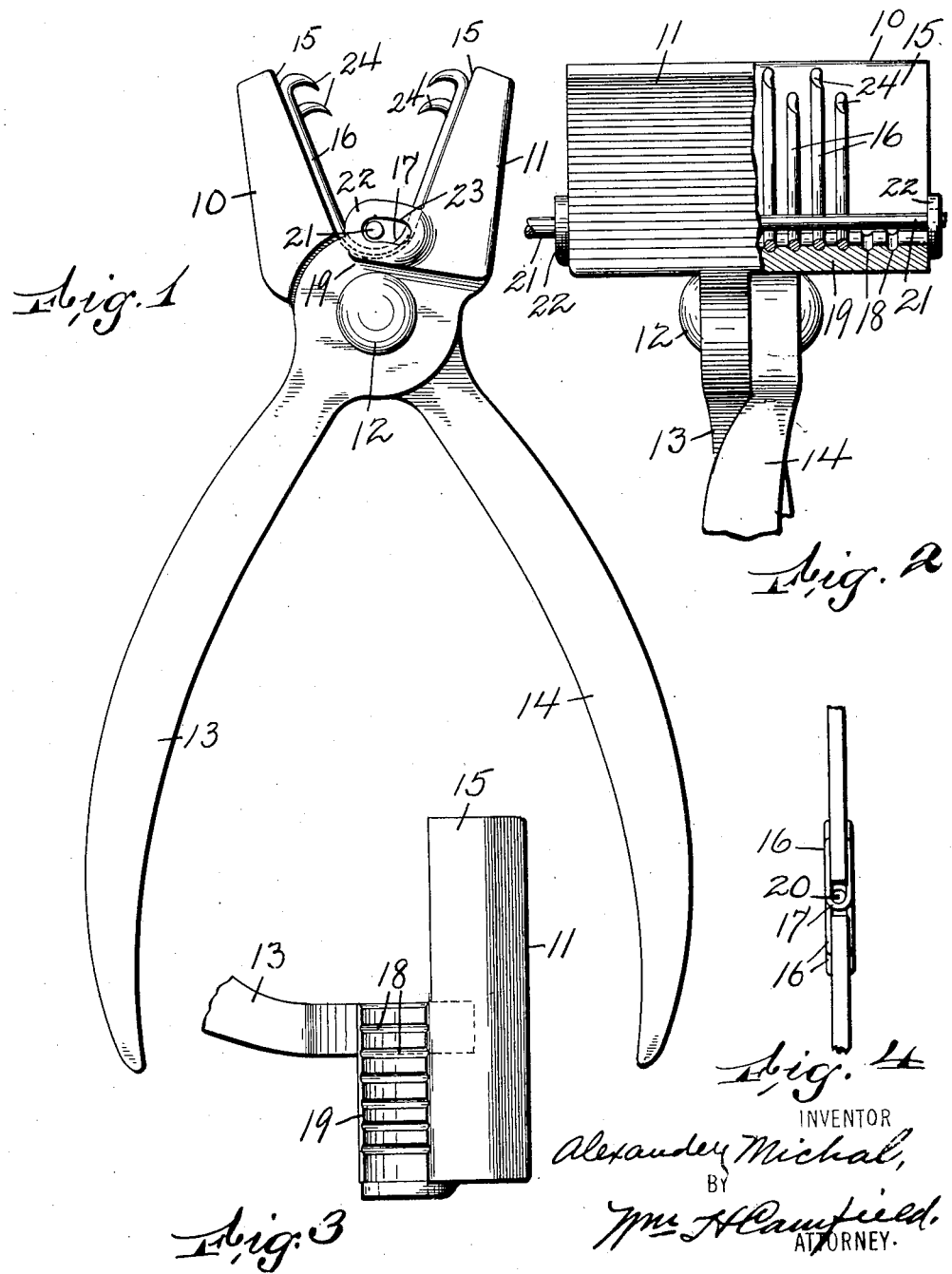

ALEXANDER MICHAL, OF WEST ORANGE, NEW JERSEY.

BELT-STAPLING DEVICE.

1,350,826.  Specification of Letters Patent.  Patented Aug. 24, 1920.

Application filed March 26, 1920. Serial No. 368,837.

*To all whom it may concern:*

Be it known that I, ALEXANDER MICHAL, a citizen of Czechoslovakia, and a resident of West Orange, county of Essex, and State of New Jersey, have invented certain new and useful Improvements in Belt-Stapling Devices, of which the following is a specification.

This invention relates to an improved tool for attaching staples to driving belts to join the ends thereof, both in new belts and for the purpose of repairing belts that are broken. At present large machines are used, and these being in fixed position, in large plants a number of these machines must be installed or else a great deal of time is wasted by workmen going to these machines to fix the belts and then returning to the place where the belts are used.

The present invention relates to a hand tool which can be carried by a workman and very much resembles a pair of pliers, which holds a series of these staples which are now furnished on cards or strips for use, holding them so that they are maintained in alinement until they have been forced into the material of the belt, and also positioning a strand inside the staples, which strand is afterward removed and replaced by a strip or strand of catgut or the like to join the two ends of the belt that are provided with the staples aforesaid.

These tools, when made in one or two sizes, are sufficient for a considerable range of belts, one form, for instance, being two inches in width and thus being able to repair all belts of this width or less by one operation at each end of the belt.

The invention is illustrated in the accompanying drawing, in which Figure 1 is a side view of a tool made according to my invention. Fig. 2 is an end view of the device shown in Fig. 1, with the handle broken away and with one end of the nearest jaw shown in section. Fig. 3 is a top view of one of the jaws illustrated in Fig. 1, and Fig. 4 is a view illustrating the ends of a belt fastened together by staples used in the device.

The tool consists of pivoted jaws 10 and 11, held together by a nut or a bolt 12, so that they can swing, and being provided with suitable handles 13 and 14, the jaws having opposed inner faces 15 that are preferably flat and against which the backs of the staples 16 rest, the looped or closed end 17 of the staples being seated in grooves 18 arranged on the jaws, preferably on the hub portions 19 thereof, and being rounded so as to conform approximately to the curvature of the closed end of the staples, so that the staples are held spaced apart, and, being supported on each side for their entire length, are maintained in parallel relation during the stapling operation.

When stapling of this kind is done, a wire or similar strand is placed within the staple so that there is insured, during the pressing of the staples, an opening through the closed end of the staples for the insertion of a pivotal strand 20 in the finished belt, this being shown particularly in Fig. 4, this strand forming a pivot and thus providing not only for the joining, but also for the flexibility of the belt at this point.

To insure such opening I provide means for supporting a wire or other suitable strand 21, such means consisting of lugs 22, preferably one on each end of the device, each lug 22 being provided with a slot 23 which is concentric to the pivot of the jaws, so that when the jaws are swung the strand 21 is not displaced.

It will be evident that when the tool is to be used the staples 16 are placed in it, and then the strand 21 is slid through and the handles 13 and 14 drawn together, which forces the ends of the staples, which are preferably pointed, as at 24, into the belt, lying close to and substantially parallel with the belt, as shown in Fig. 4, and then the strand 21 is pulled out and the jaws opened and the operation is complete.

When two ends of a belt have been so provided with staples the closed ends of the staples are joined and the strand 20, usually of catgut, is seated into the space which is insured by the presence of the strand 21 and the belt is ready for use.

It will be evident that minor changes can be made in the construction without departing from the scope of the invention.

I claim:

A belt stapling device comprising a pair of pivoted jaws, handles to operate said jaws, said jaws having curvede recesses where they converge to receive the closed ends of the staples, lugs connected to said jaws and having slots concentric with the pivot of said jaws, and a strand supported in said slots and extending within said staples to position the same.

In testimony that I claim the foregoing, I have hereto set my hand, this 25th day of March, 1920.

ALEXANDER MICHAL.